(12) United States Patent
Vroomen (10) Patent No.: US 8,483,875 B2
(45) Date of Patent: Jul. 9, 2013

(54) SYSTEM AS WELL AS A METHOD FOR CONTROLLING A SELF MOVING ROBOT

(75) Inventor: Hubert Gerard Jean Joseph Amaury Vroomen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 234 days.

(21) Appl. No.: 12/602,226

(22) PCT Filed: Jun. 2, 2008

(86) PCT No.: PCT/IB2008/052133
§ 371 (c)(1),
(2), (4) Date: Nov. 30, 2009

(87) PCT Pub. No.: WO2008/149273
PCT Pub. Date: Dec. 11, 2008

(65) Prior Publication Data
US 2010/0174408 A1 Jul. 8, 2010

(30) Foreign Application Priority Data
Jun. 5, 2007 (EP) .................................... 07109585

(51) Int. Cl.
*G05B 19/18* (2006.01)
*G05B 15/00* (2006.01)
(52) U.S. Cl.
USPC .............. 700/254; 700/1; 700/245; 700/248; 700/250; 700/258
(58) Field of Classification Search
None
See application file for complete search history.

(56) References Cited

U.S. PATENT DOCUMENTS

| | | | |
|---|---|---|---|
| 4,994,970 A * | 2/1991 | Noji et al. | 701/25 |
| 5,646,494 A | 7/1997 | Han | |
| 5,959,423 A * | 9/1999 | Nakanishi et al. | 318/568.12 |
| 5,974,347 A | 10/1999 | Nelson | |
| 7,720,554 B2 * | 5/2010 | DiBernardo et al. | 700/56 |
| 2003/0028993 A1 | 2/2003 | Song et al. | |
| 2004/0210343 A1 | 10/2004 | Kim et al. | |
| 2005/0213082 A1* | 9/2005 | DiBernardo et al. | 356/139.03 |
| 2006/0020369 A1 | 1/2006 | Taylor et al. | |
| 2006/0076039 A1 | 4/2006 | Song et al. | |
| 2006/0180647 A1 | 8/2006 | Hansen | |
| 2006/0273749 A1* | 12/2006 | Im | 318/587 |
| 2007/0061041 A1* | 3/2007 | Zweig | 700/245 |
| 2007/0096089 A1* | 5/2007 | Lazarev | 257/40 |
| 2010/0228421 A1* | 9/2010 | DiBernardo et al. | 701/28 |

FOREIGN PATENT DOCUMENTS

| | | |
|---|---|---|
| DE | 10346216 B3 | 9/2004 |
| EP | 0304342 A2 | 2/1989 |

(Continued)

*Primary Examiner* — Ian Jen (57) ABSTRACT

A system provided with a base station (2) comprising a signal emitting module, a self movable robot comprising at least an energy storage, a sensor for sensing this signal emitted by signal emitting module of the base station and a processor for controlling the movement of the robot by means of the sensed signal to return the robot to the base station. The robot comprises means for controlling the movement of the robot to move the robot randomly over a surface, whereby the absolute position of the robot is not memorized, means for marking the interrupt location (5) where the movement of the robot is interrupted to return to the base station and means for returning the robot from the base station to the interrupt location (5) by means of said marking.

16 Claims, 6 Drawing Sheets

FOREIGN PATENT DOCUMENTS

| | | |
|---|---|---|
| GB | 2053516 A | 2/1981 |
| GB | 2290143 A | 12/1995 |
| JP | 3113516 A | 5/1991 |
| JP | 8241123 A | 9/1996 |
| JP | 8317712 A | 12/1996 |
| JP | 8326025 A | 12/1996 |
| JP | 11282533 A | 10/1999 |
| JP | 2007122327 A | 5/2007 |

* cited by examiner

SYSTEM AS WELL AS A METHOD FOR CONTROLLING A SELF MOVING ROBOT

FIELD OF THE INVENTION

The invention relates to a system provided with a base station comprising a signal emitting module, a self movable robot comprising at least an energy storage, a sensor for sensing the signal emitted by signal emitting module of the base station and a processor for controlling the movement of the robot based on the sensed signal to return the robot to the base station.

The invention furthermore relates to a method for controlling a self moving robot.

BACKGROUND OF THE INVENTION

Such a robot, which is known from US-A1-2006/0273749 can be used for cleaning areas for example by means of vacuum cleaning.

Such kind of a robot preferably comprises a energy storage by means of which power can be supplied to several components of the robot like a vacuum cleaner, a propelling unit for moving the robot and for example a sensor for the detecting obstacles in the neighbourhood of the robot.

For example when the charging level of the energy storage is lower than a predetermined reference level, the robot must return to the base station to recharge the energy storage. Another reason for returning to the base station might be to empty a dust container or to refill a water container.

To be able to find the base station, the base station comprises a signal emitting module which signal is being detected by a sensor of the robot. As soon as the base station has been detected, the robot is moved back under the control of the processor to the base station. For moving the robot back to the base station it is not necessary to know the absolute position of the robot with respect to the base station. Due to the signal emitted by the signal emitting module of the base station, the direction to which the robot should be moved is known.

After recharging the energy storage, the robot should resume the vacuum cleaning or other operation it was performing before being interrupted.

If the robot resumes its operation from the base station the area around the base station will be cleaned again and the area in the neighbourhood of the position where the cleaning operation was interrupted will not be cleaned at all.

However since the absolute position of the robot at the moment that the operation of the robot was interrupted is not known, it is not possible to resume the operation from the interrupt location.

To provide the robot with means for sensing, detecting and memorizing constantly the absolute position of the robot with respect to the base station to be able to move the robot back to the interrupt location, is relatively costly and complicated.

SUMMARY OF THE INVENTION

It is an object of the invention to provide a system which is relatively simple whereby the robot can resume its operations after returning to the base station from the interrupt location.

This object is achieved by the system according to the invention in that the robot comprises:

means for controlling the movement of the robot to move the robot randomly over a surface, whereby the absolute position of the robot is not memorized, means for marking an interrupt location where the movement of the robot is interrupted to return to the base station, means for returning the robot from the base station to the interrupt location, which means use said marking.

By marking the interrupt location, the robot can easily be moved back to the interrupt location without the necessity of knowing the absolute position of the interrupt location with respect to the base station. Only the relative position of the interrupt location with respect to the robot needs to be known.

An embodiment of the system according to the invention is characterized in that the means for marking the interrupt location comprise at least one beacon which is placed by the robot on at least the interrupt location and remains on the interrupt location at least until the robot is returned from the base station to the interrupt location.

Such a beacon can easily be placed by a robot. The beacon can be physical, e.g. an object or rather semi-permanent physical change placed on the interrupt location, for example a change in temperature or colour. Preferably the beacon enables the robot to resume the exact position and orientation as before the moment that the operation was interrupted. In this manner the robot can resume its randomly movements as if no interruption had occurred.

Another embodiment of the system according to the invention is characterized in that the beacon comprises a signal emitting module, which signal can be sensed by the sensor of the robot.

The signal as emitted by the signal emitted module can be sensed by the robot by the same sensor by means of which the signal of the base station is being sensed. Preferably the signals differ so that the robot can recognized whether the signal is emitted by the base station or by the beacon. It is also possible that a signal emitted by the module on the beacon is sensed by another sensor of the robot.

Yet another embodiment of the system according to the invention is characterized in that the robot comprises several beacons to be placed on a path between the interrupt location and the base station.

The placement of several beacons might be necessary if the expected distance between the base station and the interrupt location is relatively long or that it is expected that obstructing objects are present between the base station and the interrupt location, in which case the robot needs to be guided around said obstructing objects.

A further embodiment of the system according to the invention is characterized in that the means for marking the interrupt location comprise a memory for memorizing the movements of the robot from the interrupt location to the base station, and that the means for returning the robot from the base station to the interrupt location use said memory.

By memorizing the movements of the robot when moving back from the interrupt location to the base station, the absolute position of the interrupt location is still not known but the interrupt location can be found back by moving the robot in the opposite directions as to the directions when moving from the interrupt location to the base station.

BRIEF DESCRIPTION OF THE DRAWINGS

The invention will now be explained in more detail with reference to the drawings in which.

DETAILED DESCRIPTION OF THE EMBODIMENTS

Like parts are indicated by the same numerals in the figures.

Figure 1:
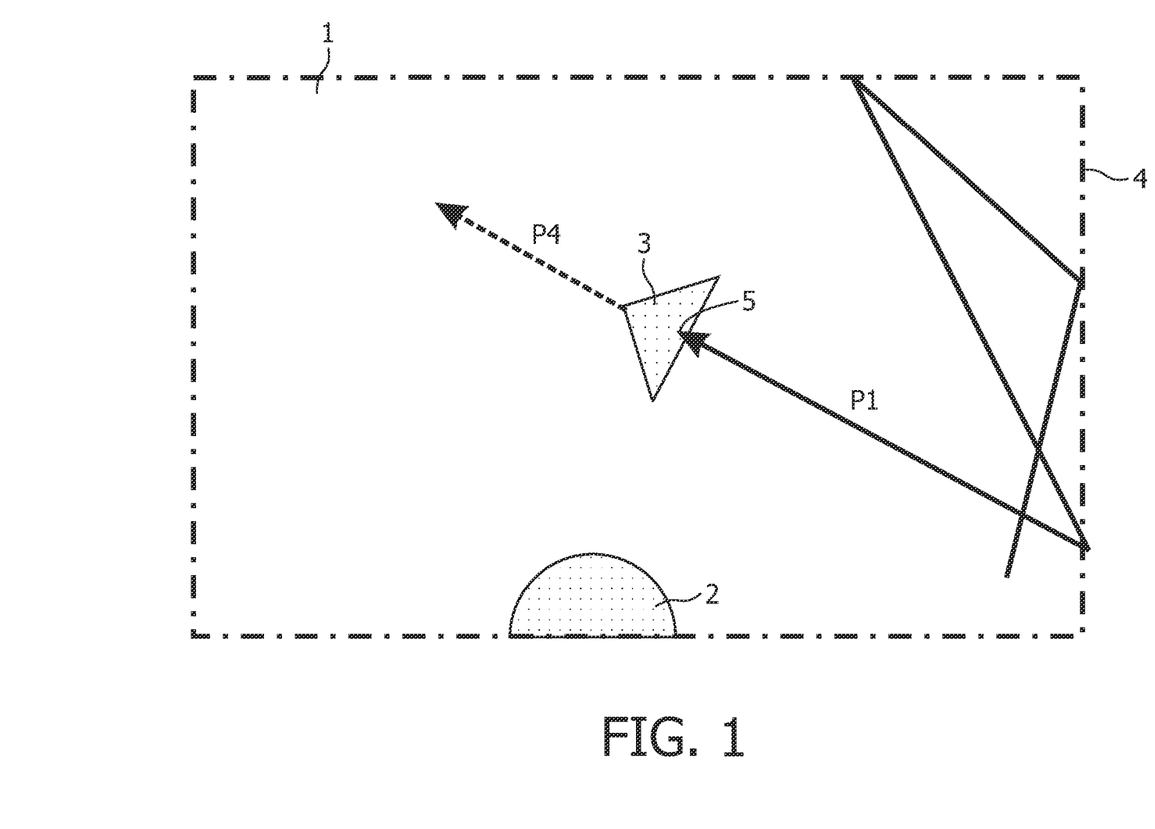
FIGS. 1-5 are top views of five different embodiments of the system according to the invention.

FIG. 1 shows a room 1 in which a base station 2 and a robot 3 are positioned. The robot is moved through the room 1, whereby the robot follows path P1. Every time the robot reaches a wall 4 of the room 1, the direction of the linear path P1 is being changed. At an interrupt position 5 of the robot 3, shown in FIG. 1 the movement of the robot 3 is being interrupted, for example for a short break. After the break the movement of the robot 3 is being continued along path P4 extending in the same direction as the path P1.

Figure 2:
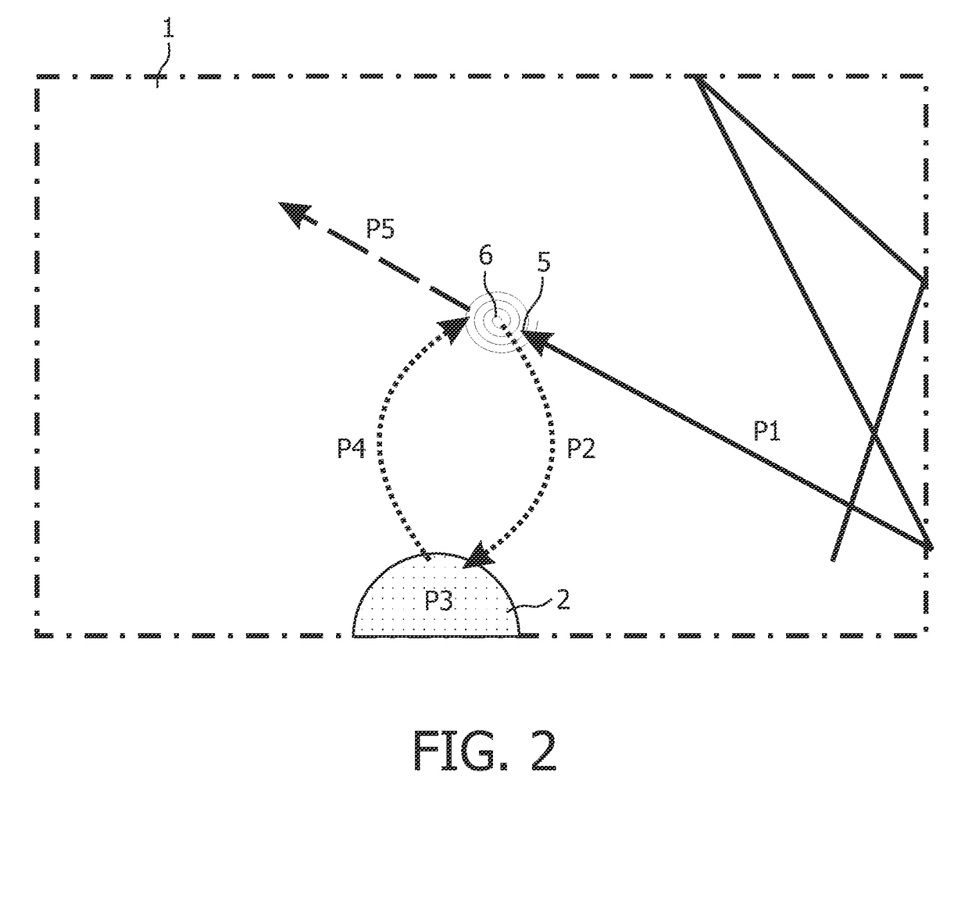

FIG. 2 shows a second embodiment of the system according to the invention, whereby at the interrupt position 5 a physical property, like for example the temperature or colour 6 of the environment is being changed. At the interrupt position the robot 3 searches the base station 2 based on signals emitted by the base station 2. The robot 3 is then moved up along a path P2 to the base station 2. At the base station 2 an energy storage can be recharged, the dust container can be emptied, a water container can be refilled, et cetera. This procedure is indicated by P3. After the procedure P3 at the base station 2 has been completed, the robot 3 is returned to the interrupt position 5 along path P4, whereby the modified property 6 is sensed by the robot 3 so that the robot 3 is able to refine the interrupt location 5. At the interrupt location 5 the robot 3 is controlled to move further along path P5 extending in the same direction as the path P1. The path P1 is the path along which the robot 3 was moving before the movement was interrupted.

Figure 3:
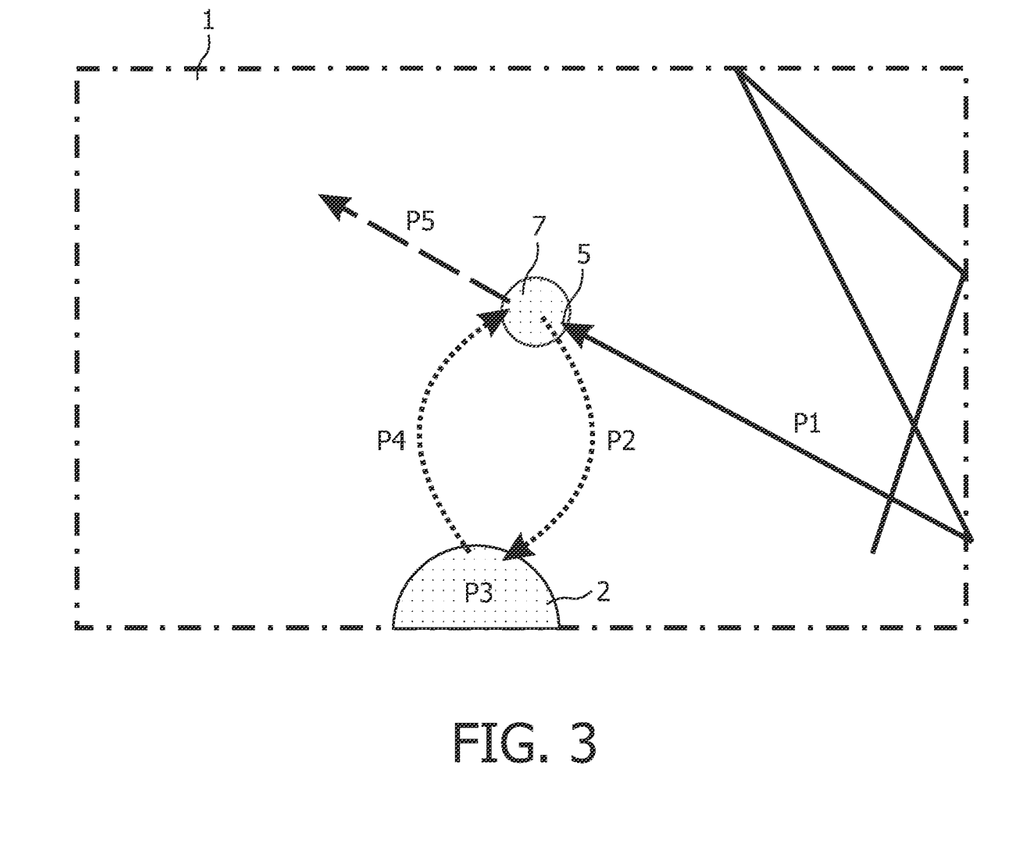

FIG. 3 shows a third embodiment of the system according to the invention whereby the robot 3 is first being moved along path P1 until the movement is being interrupted. At the interrupt position 5 a beacon 7 is placed by the robot 3. The beacon 7 is an object which can easily be placed and recognized by the robot 3, like for example a pin, a ball, et cetera. Preferably the beacon 7 has a certain orientation which enables the robot 3 to remember the direction of movement before the interruption.

After the beacon 7 has been placed by the robot 3, the robot 3 senses a signal emitted by the base station 2 and is being moved along path P2 to the base station 2. As with the embodiment shown in FIG. 2 several procedures P3 can take place in the base station 2. After completing of the procedures P3, the robot 3 senses the beacon 7 and is moved back to the beacon 7 along path P4. The beacon is then picked up by the robot and the robot continues its movement along path P5 extending in the same direction as the path P1.

Figure 4:
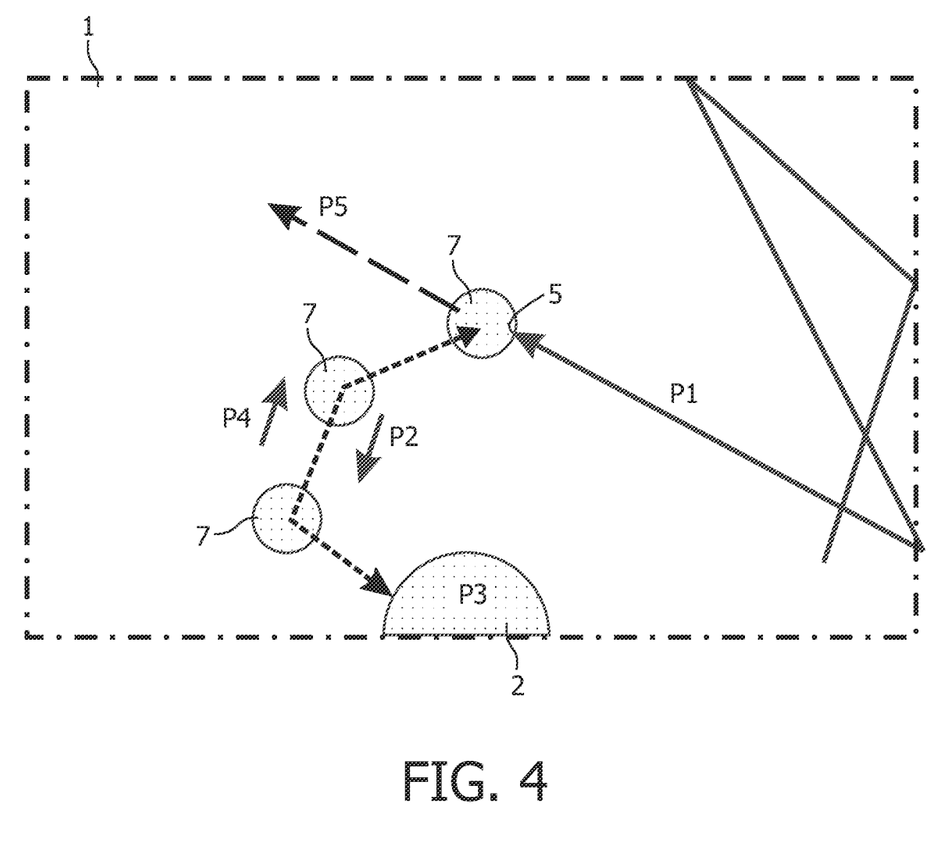

FIG. 4 shows a fourth embodiment of the system according to the invention which system is similar to the system as shown in FIG. 3. By the system according to FIG. 4 several beacons 7 are being placed at the interrupt position 5 and along the path P2 to the base station 2. On its way back from the base station 2 to the interrupt position 5 the robot 3 picks up all the beacons 7.

Figure 5:
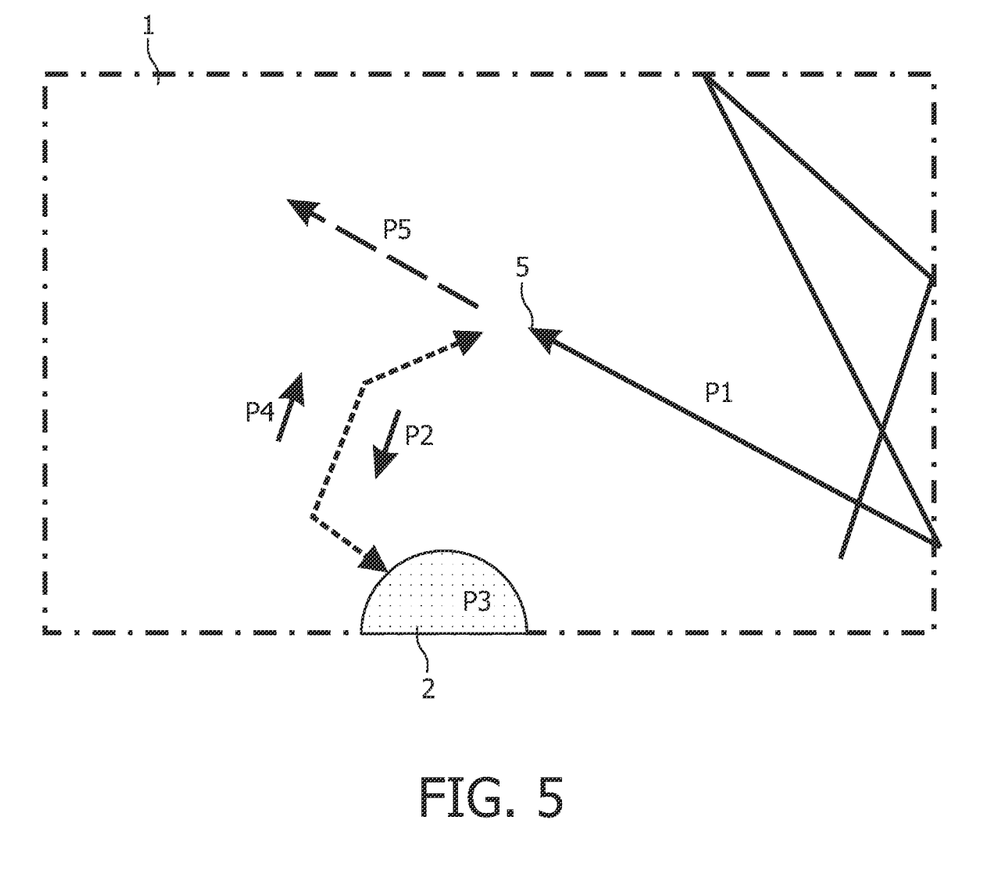

FIG. 5 shows a fifth embodiment of the system according to the invention, whereby at the interrupt position 5 the base station 2 is being detected by the robot 3. While moving back to the base station 2 along path P2 the movements of the robot 3 are being memorized. When returning from the base station 2 to the interrupt position 5 the same movements but reverse are being made by the robot 3 to move the robot 3 back along a path P4 which is identical to the path P2. Also by this embodiment the robot 5 continues its movement along path P5 after the interruption.

The signal emitting module of the base station might be a module emitting signals itself or a module emitting or reflecting signals received from the robot.

Figure 6:
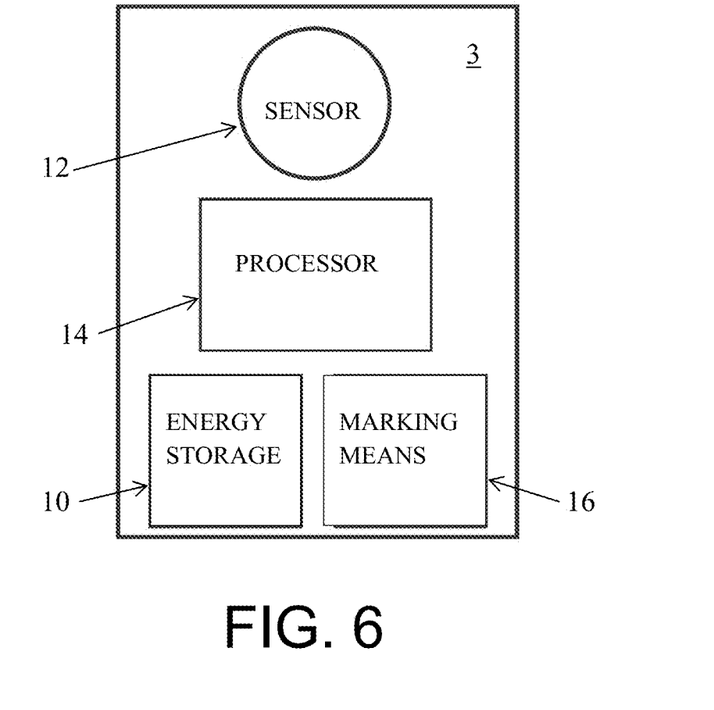
FIG. 6 is a block diagram of a robot in accordance with an embodiment of the invention.

An embodiment of a system in accordance with the invention includes a base station comprising a signal emitting module and a self movable robot. FIG. 6 illustrates a block diagram of such a robot 3, comprising at least an energy storage 10, a sensor 12 for sensing this signal emitted by signal emitting module of the base station and a processor 14 for controlling the movement of the robot by means of the sensed signal to return the robot to the base station. The robot comprises means for controlling the movement of the robot to move the robot randomly over a surface, whereby the absolute position of the robot is not memorized, means 16 for marking the interrupt location where the movement of the robot is interrupted to return to the base station and means for returning the robot from the base station to the interrupt location by means of said marking.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A system comprising:
    a base station comprising a first signal-emitting module for emitting a first signal, and
    a self-movable robot comprising at least an energy storage, a sensor for sensing the first signal and a processor for controlling movement of the robot, based on the sensed first signal, to return the robot to the base station,
    said robot:
    moving randomly over a surface, without memorizing absolute positions of the robot,
    providing a marking at an interrupt location where the random movement of the robot is interrupted, and
    returning from the base station to the interrupt location by using said marking.

2. A system according to claim 1 where the marking at the interrupt location comprises at least one beacon which is placed by the robot on at least the interrupt location and remains on the interrupt location at least until the robot is returned from the base station to the interrupt location.

3. A system according to claim 2 where the at least one beacon comprises a second signal-emitting module for emitting a second signal that can be sensed by the sensor of the robot.

4. A system according to claim 2 where several beacons are placed on a path traversed from the interrupt location to the base station for use in returning the robot to the interrupt location.

5. A system according to claim 1 comprising a memory for memorizing movements of the robot from the interrupt location to the base station, said means for returning the robot from the base station to the interrupt location using said memorized movements.

6. A method for controlling a self-moving robot, the method comprising:
    moving the robot randomly over a surface without memorizing absolute positions of the robot, interrupting the random movement of the robot for return to a base station, providing a marking at an interrupt location where the random movement of the robot is interrupted, sensing a signal emitted by an emitting module of the base station, moving the robot by means of the signal to the base station, returning the robot from the base station to the marked interrupt location by using the marking, resuming the random movement of the robot over the surface.

7. A method as in claim 6 where the marking provided at the interrupt location comprises a beacon.

8. A method as in claim 7 where the beacon emits a signal for guiding the robot to the interrupt location.

9. A method as in claim 6 further including memorizing movements of the robot from the interrupt location to the base station for use in returning the robot to the interrupt location.

10. A method for controlling a self-movable robot for cleaning a surface, said method comprising:

moving the robot randomly over the surface without memorizing absolute positions through which said robot moves;

upon the occurrence of a predetermined condition of the robot, interrupting the random movement of said robot for return to a base station;

providing a marking at a location where the random movement of the robot is interrupted;

sensing a signal emitted from the base station and utilizing said signal for guiding the robot to the base station; and returning the robot from the base station to the marking, where the random movement of the robot was interrupted.

11. A method as in claim 10 where the robot comprises a rechargeable energy storage and the predetermined condition comprises a charging level that is lower than a predetermined reference level.

12. A method as in claim 10 where the predetermined condition comprises the need to empty a dust container.

13. A method as in claim 10 where the predetermined condition comprises the need to refill a liquid container.

14. A method as in claim 10 where the marking provided at the location where the random movement of the robot is interrupted comprises a beacon.

15. A method as in claim 14 where the beacon emits a signal for guiding the robot to the location where the random movement of the robot is interrupted.

16. A method as in claim 10 further including memorizing movements of the robot from said location to the base station for use in returning the robot to said location.

\* \* \* \* \*